US005192593A

United States Patent [19]

[11] Patent Number: 5,192,593

[45] Date of Patent: Mar. 9, 1993

Matsuo et al.

[54] METHOD FOR PAINTING AUTOMOBILE DOORS BY SEQUENTIALLY HOLDING AND PAINTING PORTIONS OF THE DOOR

[75] Inventors: Hisashi Matsuo; Jyunji Itoh, both of Kobe, Japan

[73] Assignee: Kabushiki Kaisha Kobe Seiko Sho, Kobe, Japan

[21] Appl. No.: 720,697

[22] Filed: Jun. 25, 1991

[30] Foreign Application Priority Data

Jun. 27, 1990 [JP] Japan .................................. 2-68125
May 16, 1991 [JP] Japan .................................. 3-111989

[51] Int. Cl.[5] ...................... B05B 13/02; B05C 13/02; B05D 1/02; B25J 11/00

[52] U.S. Cl. .................................... 427/421; 118/500; 118/503; 118/697; 118/704; 901/43

[58] Field of Search ................ 427/421; 118/500, 503, 118/697, 704; 414/744.4, 744.5; 901/43

[56] References Cited

U.S. PATENT DOCUMENTS

| | | | |
|---|---|---|---|
| 4,342,536 | 8/1982 | Akeel et al. | 414/744.5 |
| 4,423,999 | 1/1984 | Choly | 118/500 |
| 4,498,414 | 2/1985 | Kiba et al. | 901/43 |
| 4,556,361 | 12/1985 | Bartlett et al. | 901/43 |
| 4,710,044 | 12/1987 | Kikuchi et al. | 901/43 |

*Primary Examiner*—Michael Lusignan
*Assistant Examiner*—Katherine A. Bareford
*Attorney, Agent, or Firm*—Oblon, Spivak, McClelland, Maier & Neustadt

[57] ABSTRACT

In order for paints not to be adhered to the device for opening and closing a door and to the door fixing unit for maintaining the open state of a door when painting doors of an automobile, the door is alternately held by the opening and closing device and the door fixing unit. The portion of the door which is not held is to be painted, thereby preventing paint from being sprayed directed on the opening and closing device and the door fixing unit with which the door is held, and preventing paint from adhering to these members.

2 Claims, 3 Drawing Sheets

METHOD FOR PAINTING AUTOMOBILE DOORS BY SEQUENTIALLY HOLDING AND PAINTING PORTIONS OF THE DOOR

BACKGROUND OF THE INVENTION

1. Field of the Invention

The present invention relates to the method and equipment for painting automobiles by a painting robot (painting equipment) with, for instance, a door (opening and closing member) of an automobile open.

2. Description of the Prior Art

Generally, as in a automobile manufacturing line an automobile placed on a carrier comes to a stop at the position of painting on a manufacturing line of automobiles, the door thereof is opened and the painting is carried out by for instance a painting robot.

In this case, conventionally there were two ways for opening the door. According to the first way, the door 2 of an automobile 1 is opened by the painting robot 3 itself as shown in FIG. 3. As the door 2 is opened by the painting robot, the door 2 is fixed with a door fixing unit 4 in order to keep the door 2 in the opening state thereof. Namely, the shift-down lever 5 is shifted and driven upwards from the floor surface, and a pushing rod 6 attached to the distal end of the shift-down lever 5 is brought into contact with the inner plane of the door 2. And the door 2 is fixed at the opening state thereof by fully pushing the door 2 in the opening direction by means of the pushing rod 6. Thereafter, the painting is carried out for the inside of an automobile and the door 2 itself by the painting robot 3.

On the other hand, according to the second way, an exclusive door opening and closing device 7 for opening and closing the door 2 is used as shown in FIG. 4.

Namely, the engaging claw 9 attached to the distal end of the arm 8 is engaged with the door 2, and the door 2 is opened by moving the arm 8 along an appointed locus. And while the inside of the automobile 1 and the door 2 are being painted by the painting robot, the opening state of the door 2 can be maintained by the corresponding door opening and closing device 7.

Hence, as painting method described in the above the painting work is conducted with the pushing rod 6 or the engaging claw 9 brought in contact or engaged with the door 2, the paint is adhered to the rod and the claw. And at a time of conducting the painting similar to the above in other automobiles, the paint adhered to the above components such as the rod and the claw may be adhered to other automobiles, thereby causing such a problem as a painting defect to occur.

Furthermore, the paint which is ejected from the painting robot can not be sprayed on the portions with which the pushing rod 6 and the engaging claw 9 is brought in contact or engaged since these components disturb the spraying thereof, thereby causing such a problem as painting unevenness to occur.

SUMMARY OF THE INVENTION

It is therefore an object of the present invention to provide a method and equipment for painting an automobile, by which it can be avoided for the paint to be coated to the fixtures for fixing a door at the opened position thereof with the door opened when painting the automobile and at the same time the whole door can be evenly painted.

In order to achieve the object, a method for painting an automobile according to the first aspect of the invention is characterized in that in a method for painting an automobile, by which the painting is executed by a painting equipment with the door (a term intended to generically cover any opening and closing member) of an automobile opened by the opening and closing device, a second portion which differs from the first portion held by the opening and closing device can be held by the door fixing unit to enable the opening state thereof to be maintained, and at the same time the portions of the door held by the door fixing unit and the opening and closing device can be painted alternately by the painting equipment with the kept on the opening state thereof by alternately actuating the opening and closing device and the door fixing unit.

An equipment for painting an automobile according to the second invention is characterized in that an equipment for painting an automobile, by which the painting is executed by a painting equipment with the door of an automobile opened, comprises an opening and closing device for holding, opening and closing the door, a door fixing unit for maintaining the opening state of the door, which is opened by the opening and closing device, by holding a second portion thereof which differs from the first portion thereof held by the opening and closing device, painting means and controlling means by which the painting work can be alternately executed by the painting means on the portion of the door held by the door fixing unit and the opening and closing device with the opening state of the door maintained by alternately actuating the opening and closing device and the door fixing unit.

In a method and equipment for painting an automobile according to the present invention, the opening and closing member such as a door which is opened by the opening and closing device thereof can be held by the door fixing unit by which a second portion differing from the first portion held at the opening state thereof by the opening and closing device is held. At the same time, the opening state of the opening and closing member can be maintained by alternately actuating the opening and closing device and the door fixing unit, and the painting work can be alternately executed by the painting equipment on the portions of the opening and closing member held by the door fixing unit and the opening and closing device.

As a result, any paint can not be adhered to the portions of the opening and closing device and the door fixing unit, which are brought into contact or engaged with the opening and closing member. Moreover, the paint can be evenly sprayed on the whole area of the opening and closing member.

DETAILED DESCRIPTION OF A PREFERRED EMBODIMENT

With reference to the drawings attached hereto, a preferred embodiment in which the present invention is embodied is described for better understanding of the present invention. The ensuing preferred embodiment is one of the examples in which the present invention is embodied but it is not intended as limiting the technical scope thereof.

Figure 1:
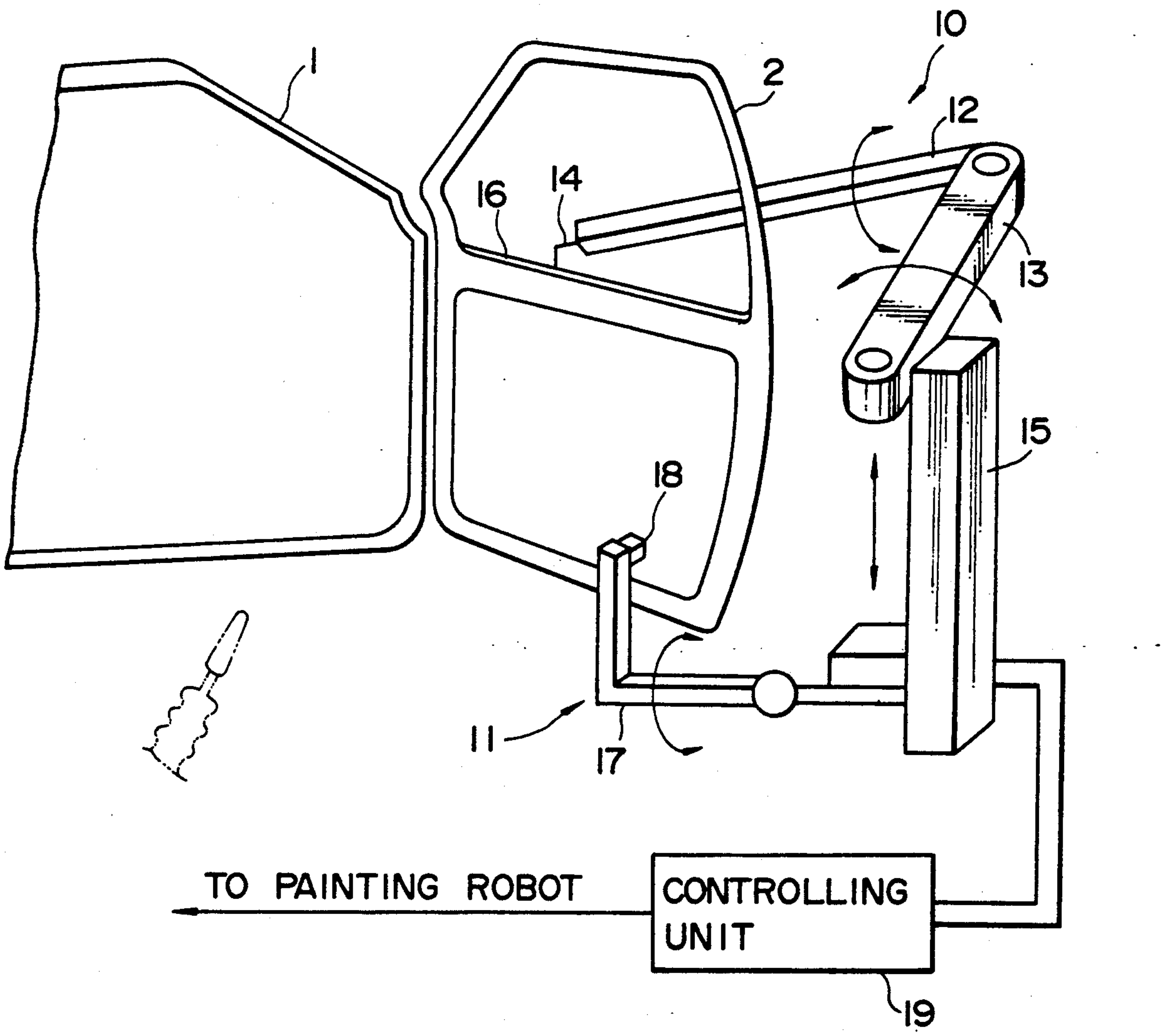
FIG. 1 is a diagrammatical view showing the composition of main portions of a painting equipment of automobile according to a preferred embodiment of the present invention.
Figure 2:
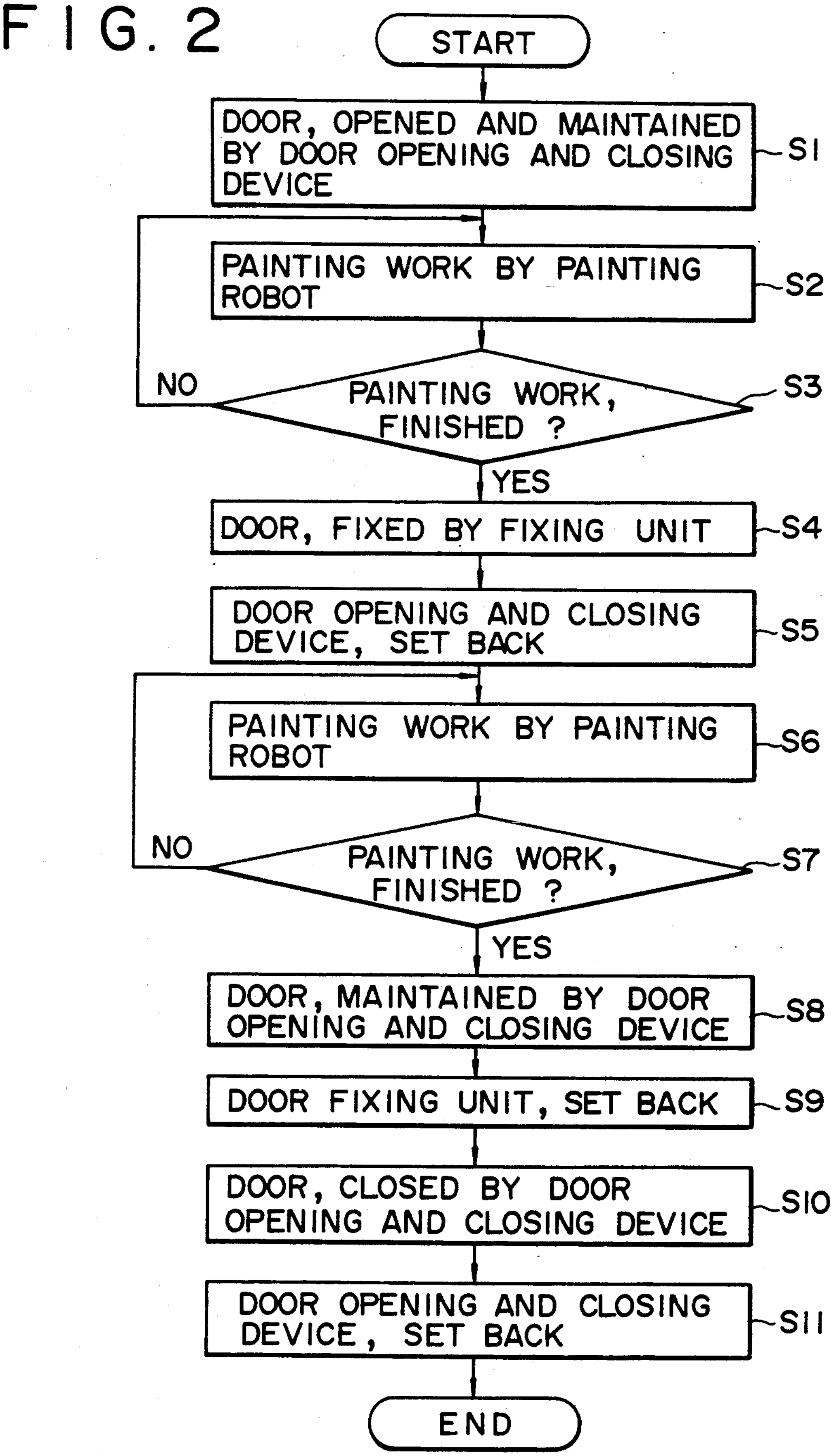
FIG. 2 is a flow chart showing the sequence of steps in the painting of an automobile.
Figure 3:
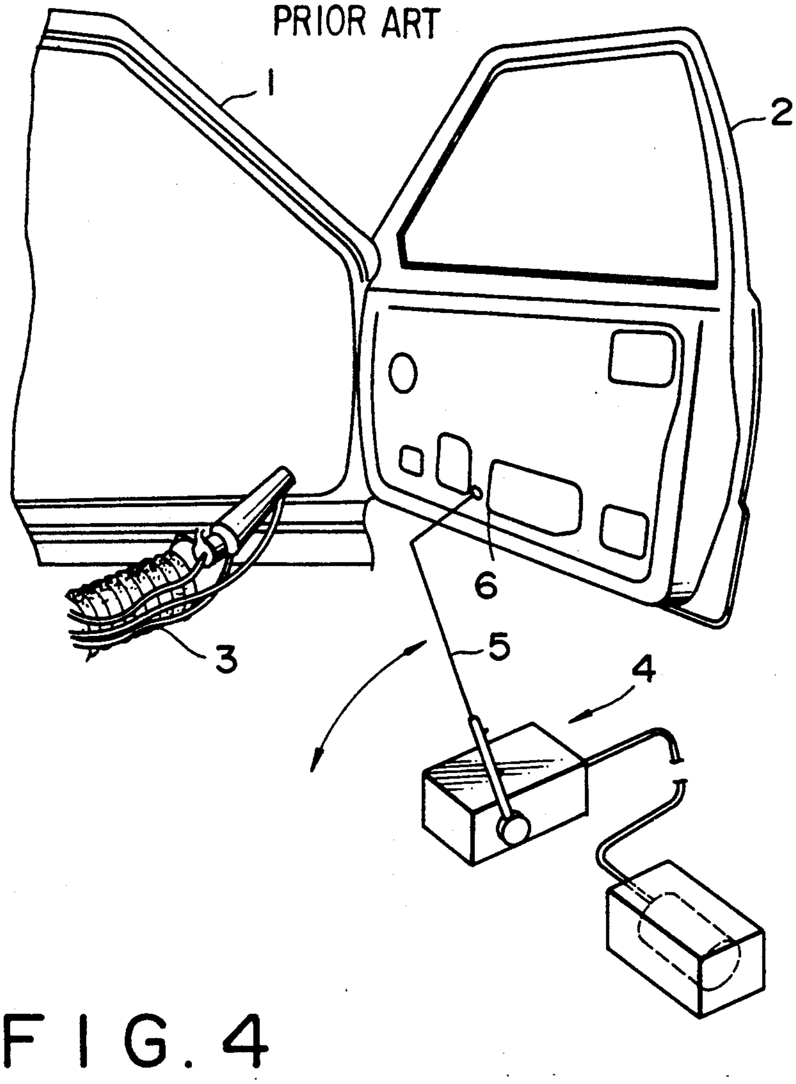
FIG. 3 PRIOR ART
FIG. 3 is a diagrammatic view of a conventional painting equipment.
Figure 4:
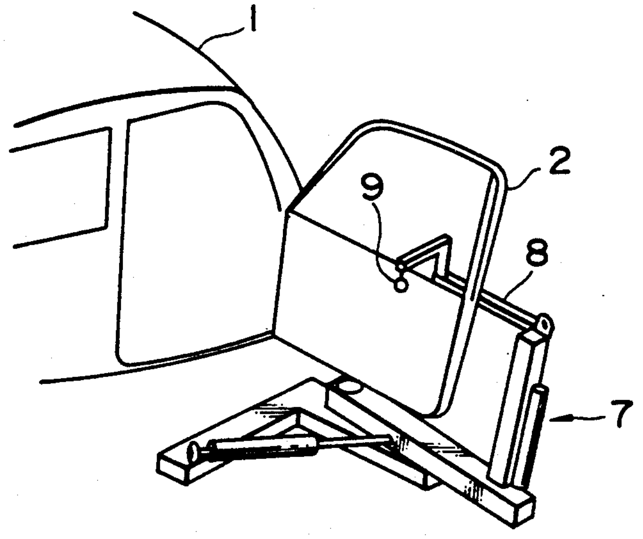
FIG. 4 PRIOR ART
FIG. 4 is a diagrammatic view of a conventional painting method.

Herein, FIG. 1 is a diagrammatical view showing the composition of main portions of a painting equipment of an automobile according to a preferred embodiment of the present invention, and FIG. 2 is a flow chart showing the sequence of steps in the painting of automobile.

The painting equipment of automobile according to the preferred embodiment is so composed that, as shown in FIG. 1, it can comprise a door opening and closing unit 10 for holding, opening and closing a door 2 of an automobile 1, a door fixing unit 11 for maintaining the door 2, which is opened by the door opening and closing device 10, at the opening state thereof by holding the portion differing from the portion held by the door opening and closing device 10, and a controlling unit 19 by which the painting work can be alternately executed by for instance a painting robot on the portions of the door 2, which is held by the door fixing unit 11 and the door opening and closing device 10, with the opening state thereof maintained by alternately actuating the door opening and closing device 10 and the door fixing unit 11.

The door opening and closing device 10 is furnished with an arm 13 slidable in the vertical direction to the base frame 15 and swingable in a plane parallel to the opening and closing direction of the door 2, and the distal end of the arm 13 is provided with another arm 12 swingable in the same plane as the swinging direction of the arm 13. Furthermore, an engaging claw 14 which can be inserted in and engaged with a sash portion 16 at the upper first part of the door 2 is mounted at the distal end of the arm 12.

The door 2 can be opened or closed by swinging the arms 12 and 13 along an appointed locus with the engaging claw 14 engaged with the sash portion 16.

The door fixing unit 11 is furnished with a shift-down lever 17 shiftable to the floor plane, and a pushing rod 18 is attached to the free end of the shift-down lever 17.

And the opening state of the door 2 can be maintained by bringing the pushing rod 18 into contact with the lower second portion at the rear side of the door 2 which is opened by the door opening and closing device 10.

The controlling unit 10 has a memory (not illustrated) for memorizing programs for controlling the door opening and closing device 10 and the door fixing unit 11.

Consecutively, the processing procedure for painting by means of the painting equipment is described with reference to FIG. 2.

S1, S2, . . . in the Figure show a step of each action.

As an automobile 1 placed on a carrier (not illustrated) comes to a stop at an appointed position of painting work on a manufacturing line, the engaging claw 14 of the door opening and closing device 10 is inserted in and engaged with the sash portion 16 of the door 2, and the door 2 can be opened by swinging of the arms 12 and 13 along an appointed locus (S1).

Continuously, the opening state of the door 2 can be maintained by the door opening and closing device 10, and the inside of an automobile 1 and the underside of the door 2 can be painted by a painting robot (not illustrated) (S2).

As the painting work for the underside of the door 2 is finished (S3), the shift-down lever 17 of the door fixing unit 11 is swung upwards to cause the pushing rod 18 to be pushed to the underside of the door 2, thereby causing the opening state of the door 2 to be maintained (S4).

As the opening state of the door 2 is maintained by means of the door fixing unit 11, the door opening and closing device 10 is set back to an appointed position (S5), and the upper side of the door 2 and the sash portion 16 thereof are painted by the painting robot (S6).

The painting robot is so controlled that it can be engaged in painting of other portions without making a stop while the processings in the above steps S4 and S5 are being carried out.

As the painting work is finished on the upper side of the door 2 and the sash portion 16 thereof as shown in the above (S7), the engaging claw 14 of the door opening and closing unit 10 is inserted in and engaged with the sash portion of the door 2 again (S8).

Thereafter, the shift-down lever 17 of the door fixing unit 11 is withdrawn to the initial position (S9). On completion of the withdrawal thereof, the door 2 is closed by the door opening and closing device 10 (S10).

Thereafter, as the engaging claw 14 of the door opening and closing device 10 is withdrawn to the initial position (S11), the painting work for the automobile 1 on this stage is finished.

As the painting system according to the present invention is so composed as shown in the above, the painting work can be executed with the door 2 maintained in the opening state thereof by alternately holding the portion, which is not the present painting portion, by means of the engaging claw 14 of the door opening and closing device 10 and the pushing rod 18 of the door fixing unit 11, with which the door 2 can be fixed at the opening state thereof. Therefore, paint is not adhered to the engaging claw 14 and the pushing rod 18.

As a result, in the painting work for other automobiles, which is subsequently carried out, such a defect as can cause a painting mistake due to paint's adhering to the other automobiles can be completely avoided.

At the same time, the whole rear side of the door 2 can be evenly painted.

The painting method according to the present invention is so composed as shown in the above. Therefore, it can be avoided that any paint is adhered to the fixtures for fixing the opening and closing member at the opening state thereof after being opened, and at the same time the whole opening and closing member can be evenly painted.

What is claimed is:

1. A method of painting an automobile in an automated assembly line, comprising the steps of:
   - using an automated door opening and closing device to open an automobile door;
   - using the door opening and closing device engaging a first portion of the automobile door for maintaining the automobile door in an open state;
   - using a robot painting device to partially paint the held open automobile door in a region not including said first portion;

engaging a second portion of the automobile door with an automated door fixing unit so as to maintain the automobile door in an open state, the second portion being spaced from the first portion;

releasing the door opening and closing device from the automobile door; and using the robot painting device to further paint the partially painted automobile door, while engaged by the fixing unit, in said first portion.

2. The method of claim 1 including the further step of using the door opening and closing device to close the further painted door.

* * * * *